United States Patent
Lin

(10) Patent No.: US 9,708,450 B2
(45) Date of Patent: Jul. 18, 2017

(54) SILICONE HYDROGEL CONTACT LENS AND METHOD FOR MANUFACTURING THE SAME

(71) Applicant: VIZIONFOCUS INC., Miaoli County (TW)

(72) Inventor: Wen-Ching Lin, Miaoli County (TW)

(73) Assignee: VIZIONFOCUS INC., Miaoli County (TW)

( * ) Notice: Subject to any disclaimer, the term of this patent is extended or adjusted under 35 U.S.C. 154(b) by 0 days.

(21) Appl. No.: 14/825,186

(22) Filed: Aug. 13, 2015

(65) Prior Publication Data

US 2016/0046801 A1    Feb. 18, 2016

(30) Foreign Application Priority Data

Aug. 15, 2014 (TW) ............... 103128182 A

(51) Int. Cl.
| | |
|---|---|
| *C08L 83/04* | (2006.01) |
| *C08L 63/00* | (2006.01) |
| *G02C 7/04* | (2006.01) |
| *C08F 230/08* | (2006.01) |
| *C08G 77/00* | (2006.01) |
| *C08K 5/00* | (2006.01) |
| *G02B 1/04* | (2006.01) |

(52) U.S. Cl.
CPC ............ *C08G 77/00* (2013.01); *C08K 5/0025* (2013.01); *C08L 83/04* (2013.01); *G02B 1/043* (2013.01)

(58) Field of Classification Search
None
See application file for complete search history.

(56) References Cited

U.S. PATENT DOCUMENTS

| 3,137,730 A * | 6/1964 | Fitz-William ........ C07C 209/16 564/480 |
| 4,711,943 A * | 12/1987 | Harvey, III ............ C07F 7/0854 523/107 |
| 4,734,475 A | 3/1988 | Goldenberg et al. |
| 8,524,800 B2 * | 9/2013 | Phelan ............. B29D 11/00865 522/156 |
| 2006/0004165 A1 * | 1/2006 | Phelan .................. C08F 230/08 351/159.33 |
| 2008/0143003 A1 * | 6/2008 | Phelan ............. B29D 11/00865 351/159.28 |
| 2009/0200692 A1 * | 8/2009 | Chang .............. B29D 11/00048 264/1.38 |
| 2016/0046801 A1 * | 2/2016 | Lin ........................ C08G 77/00 523/107 |

FOREIGN PATENT DOCUMENTS

TW        200927792 A        7/2009

* cited by examiner

*Primary Examiner* — Peter A Salamon
(74) *Attorney, Agent, or Firm* — Chieh-Mei Wang

(57) ABSTRACT

The present invention discloses a method for manufacturing a silicone hydrogel, including the steps of: preparing a polyethylene glycol-containing secondary or tertiary amino alcohol, a crosslinking agent having at least two epoxide rings, and a copolymerization mixture capable of performing a radical chain polymerization reaction, wherein the copolymerization mixture contains a linear silicone prepolymer, a silicone monomer, and a hydrophilic monomer, the linking process is activated by heating to let the epoxide rings of the crosslinking agent open and respectively link with the amino alcohol and any one component of the copolymerization mixture; and completing the radical chain polymerization reaction to obtain a silicone hydrogel. The present invention also provides a contact lens manufactured by the aforementioned method. The present invention distributes and affixes polyethylene glycol of the amino alcohol onto the surface of the silicone hydrogel, thus providing hydrophilicity and electrical charges to the silicone hydrogel.

10 Claims, No Drawings

SILICONE HYDROGEL CONTACT LENS AND METHOD FOR MANUFACTURING THE SAME

FIELD OF THE INVENTION

The present invention relates to a hydrogel and method for manufacturing the same, and more particularly to a silicone hydrogel-based contact lens and method for manufacturing the same.

BACKGROUND OF THE INVENTION

It has been 60 years since the invention of contact lenses in early 1950s. The earliest contact lenses were made of firm materials such as polymethyl methacrylate (PMMA); due to the hard texture and poor oxygen permeability and hydrophilicity of the firm materials, the early contact lenses had short wearable time and tended to cause strong discomfort or foreign body sensation. The invention of soft contact lenses in the 70s was revolutionary. The soft contact lenses utilized a hydrogel mainly consisting of 2-hydroxy ethyl methacrylate (HEMA). Comfort of wearing contact lenses had largely improved due to their high water absorbability and the capability to soften and retain high water content upon hydration. However, the soft contact lenses could only be worn for 8-12 hours due to their poor oxygen permeability; long-term wearing had commonly led to oxygen-deficient corneal edema and angiogenesis.

Hard contact lenses with ultra high oxygen permeability entered the market in early 80s. However, hard materials causing foreign body sensation to the wearers remained an unsolved issue, thus leading to low consumer acceptance. Accordingly, there has been a need for contact lenses having high oxygen permeability, excellent comfort and long wearable hours. As the contact lenses industry continued to develop, highly oxygen permeable soft silicones or silicone hydrogels have eventually became the mainstream.

Silicone is an unstable hydrophobic material; consequently, in spite of high oxygen permeability, contact lenses made of silicone contain large amount of hydrophobic dry spots on the surfaces, again causing discomfort to the eyes of the wearers. To improve wearability of silicone contact lenses, the industry has came out with treating the surface of silicone or silicone hydrogel with plasma for conjugation with hydrophilic materials, such as HEMA, glycerol methacrylate (GMA), glycerol methyl methacrylate (GMMA), N-vinyl pyrrolidone (NVP), methacrylic acid (MAA), methyl methacrylate (MMA), and polyvinyl alcohol (PVA), aiming to improve hydrophilicity of silicone or silicone hydrogel-based contact lenses while maintaining their high oxygen permeability. However, the plasma treatment involves high production costs and complicated manufacturing processes. The conjugation of hydrophilic materials on surfaces of silicone or silicone hydrogel-based contact lenses is highly unstable, leading to high defect rate and unreducible production costs.

Another method for production of silicone hydrogel-based contact lenses takes the respective advantages of hydrophobic and hydrophilic materials and conjugates hydrophilic biomedical materials, such as HEMA, GMA, GMMA, NVP, MAA, MMA, and PVA, with silicone and hydrogel prepolymers, mainly hydrophobic polysiloxane or fluorinated silicone with high oxygen permeability, to improve water retention and wearability of silicone contact lenses.

However, quality control during such production method has been difficult due to its complicated manufacturing process and high production cost of the prepolymers. Additionally, while such method increases hydrophilicity of contact lenses, surface tension of silicone prepolymers hinders the distribution of hydrophilic materials on the lens surface, yet causing multiple hydrophobic dry spots. Moreover, phase separation is also a common issue and would result in opaque lenses with reduced light intensity. Consequently, discomfort sensations while wearing contact lenses have yet remained a challenge in the field.

SUMMARY OF THE INVENTION

Based on the foregoing, the present invention aims to increase oxygen permeability and hydrophilicity of silicone hydrogels so as to improve wearability of silicone hydrogel-based contact lenses.

The present invention provides a method for manufacturing a silicone hydrogel, which includes the steps of: preparing an amino alcohol, including a crosslinking agent having at least a first epoxide ring and a second epoxide ring, and a copolymerization mixture capable of performing a radical chain polymerization reaction, wherein the copolymerization mixture contains a linear silicone prepolymer, a silicone monomer, and a hydrophilic monomer; and performing the radical chain polymerization reaction, to obtain a silicone hydrogel, and performing a linking process before, simultaneously with, or after performing the radical chain polymerization reaction, the crosslinking agent is activated by heating to let the first epoxide ring open and link with the amino alcohol and to let the second epoxide ring open and link with any one component of the copolymerization mixture, wherein the amino alcohol is represented by formula (1):

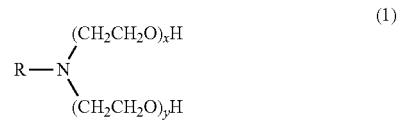

wherein R of formula (1) is either a hydrogen atom or a linear chain of 12-16 carbon atoms, and the sum of x of formula (1) and y of formula (1) falls within the range of 2 to 100.

The method is for linking the first epoxide ring with the amino alcohol to obtain a chemical structure represented by formula (2), so as to obtain a silicone hydrogel with, electrically charged and hydrophilic surfaces.

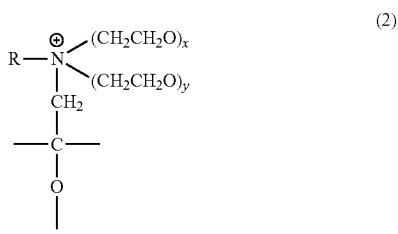

In an embodiment of the present invention, the crosslinking agent is added to the copolymerization mixture before performing the radical chain polymerization reaction, and the linking process is performed after completion of the radical chain polymerization reaction by heating the copolymerization mixture to let the first epoxide ring open and link with the amino alcohol and to let the second epoxide ring open and link with the linear silicone prepolymer.

In the aforementioned and other embodiments of the present invention, the copolymerization mixture is heated to over 90° C. for over 1 hour to open the epoxide rings of the crosslinking agent.

In an embodiment, the copolymerization mixture includes 3 wt % to 50 wt % of the silicone prepolymer, 10 wt % to 50 wt % of the silicone monomer, 20 wt % to 60 wt % of the hydrophilic monomer, 1 wt % to 10 wt % of the amino alcohol, and 1 wt % to 10 wt % of the crosslinking agent.

In another embodiment, the amino alcohol and the crosslinking agent are mixed before performing the radical chain polymerization reaction, and a first heating is performed to let the first epoxide ring open and link with the amino alcohol. The hydrophilic monomer is then added and a second heating is performed to let the second epoxide ring open and link with the hydrophilic monomer. The linear silicone prepolymer and the silicone monomer are finally added to perform the radical chain polymerization reaction. To link with opened second epoxide rings, the hydrophilic monomer is required to include a functional group selected from the group consisting of hydroxyl group, carboxyl group, and amine group.

The first heating and the second heating are performed at over 90° C. for over 1 hour.

In yet another embodiment, the amino alcohol, the crosslinking agent, and a thermal initiator are added to the copolymerization mixture before performing the radical chain polymerization reaction. The copolymerization mixture is then heated to perform the radical chain polymerization reaction and the linking process simultaneously.

The present invention also provides a contact lens manufactured by the aforementioned methods for manufacturing a silicone hydrogel.

When polyethylene glycol-containing amino alcohols are present in a copolymerization mixture, physical properties of the amino alcohols allow the amino alcohols to migrate to the surface of the copolymerization mixture and form a hydrophilic polymer on the surface of the silicone material, thus producing contact lenses with hydrophilicity and high oxygen permeability.

The invention will become more readily apparent to those ordinarily skilled in the art after reviewing the following detailed description.

BRIEF DESCRIPTION OF THE DRAWING

None.

DETAILED DESCRIPTION OF PREFERRED EMBODIMENTS

The present invention will now be described, more specifically with reference to the following embodiments. It is to be noted that the following descriptions of preferred embodiments of this invention are presented herein for purpose of illustration and description only. It is not intended to be exhaustive or to be limited to the precise form disclosed.

HEMA disclosed herein refers to 2-hydroxy ethyl methacrylate.

GMA disclosed herein refers to glycerol methacrylate.

GMMA disclosed herein refers to glycerol methyl methacrylate.

NVP disclosed herein refers to N-vinyl pyrrolidone.

MAA disclosed herein refers to methacrylic acid.

MMA disclosed herein refers to methyl methacrylate.

PVA disclosed herein refers to polyvinyl alcohol.

The main technical concept of the present invention is to add a secondary or tertiary amino alcohol to a copolymerization mixture capable of performing a radical chain polymerization reaction, and to utilize a crosslinking agent having at least two epoxide rings and heating to link the amino alcohol with any one component of the copolymerization mixture. The amino alcohol is represented by formula (1):

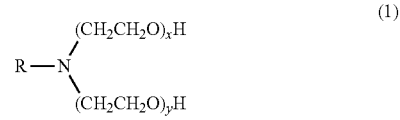

In formula (1), R of is either a hydrogen atom or a linear chain of 12-16 carbon atoms, and the sum of x and y falls within the range of 2 to 100. When the polyethylene glycol-containing secondary or tertiary amino alcohol is present in a copolymerization mixture, physical properties of the amino alcohols allow the amino alcohols to migrate to the surface of the copolymerization mixture. A chemical structure represented by formula (2) is obtained upon linking the first epoxide ring with the amino alcohol. Consequently, surface of the obtained silicone hydrogel is electrically charged and hydrophilic.

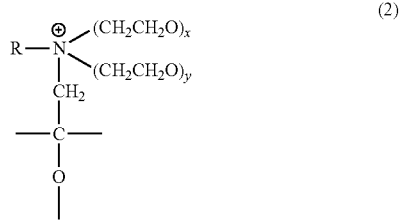

In a preferred embodiment of the present invention, a linear silicone prepolymer, a silicone monomer (such as tri(trimethylsiloxy)silylpropyl methacrylate, or TRIS), a hydrophilic monomer (such as NVP, HEMA, and N,N'-dimethylacrylamide, or DMA), a secondary or tertiary amino alcohol, and double epoxide (such as the crosslinking agent) are mixed homogeneously in a proportion to prepare a copolymerization mixture. Isopropanol as a dispersant and DAROCUR 1173 as a photoinitiator are added to perform a radical chain polymerization reaction; the reaction is performed under 2-3 mw/cm$^2$ of light exposure for 1 hour, followed by heating to over 90° C. for over 1 hour to obtain a dry silicone gel. The dry silicone gel is subjected to extraction/hydration in a 8/2 ethanol/water mixture for 1-2 hours, followed by recovery in a saline solution for another 1-2 hours to obtain a silicone hydrogel of the present invention.

Photoinitiator or thermal initiator for the radical chain polymerization reaction may be chosen according to the mechanism of the reaction, and can be any of the initiators currently available, such as the ones disclosed in U.S. Pat. Nos. 6,992,118 and 5,908,906. In an embodiment of the present invention, the photoinitiator used is DAROCUR 1173 (2-hydroxy-2-methyl-1-pentyl-1propanone).

If a photoinitiator is adopted, the radical chain polymerization reaction is performed preferably under 2 mw/cm$^2$ to 10 mw/cm$^2$ of light exposure, and more preferably under 2 mw/cm$^2$ to 5 mw/cm$^2$ of light exposure. If a thermal initiator is utilized, the radical chain polymerization reaction is heated preferably at 60-120° C. The time of light exposure and the time of heating last preferably between 10 minutes to 2 hours, and more preferably between 30 minutes to 2 hours.

The present invention also provides a contact lens made of the aforementioned silicone hydrogel. The contact lens of the present invention may be shaped by any manufacturing method known in the art. For example, a mixture containing the aforementioned silicone prepolymer, the hydrophilic monomer, and the silicone monomer can be poured into a concave mold, or a female template, to form the front surface of a lens; a structural body of the front surface of the lens with the desired pattern is obtained by rotational curing. Otherwise, the mixture can he poured into an alternative mold to obtain the structural body of the front surface of the lens with the desired pattern by photo or thermal curing; the alternative mold includes a female template to shape the front surface of the lens and a male template to shape the rear surface after the lens is formed.

In the aforementioned and other embodiments of the present invention, the crosslinking agent requires at least two epoxide rings for linking with the amino alcohol and any one component of the copolymerization mixture, respectively, so as to fix the amino alcohol onto the surface of the copolymerized silicon hydrogel. Crosslinking agents having such property include, but not limited to, poly(ethylene glycol) diglycidyl ether (PEGDE), bisphenol A propoxylate diglycidyl ether, ethylene glycol diglycidyl ether, 1,4-cyclohexanedimethanol diglycidyl ether, resorcinol diglycidyl ether, and 2,3-diepoxypropyl phthalate. PEGDE is chosen as the crosslinking agent in this embodiment.

The silicone prepolymer accounts for preferably 3 wt % to 50 wt %, and more preferably 5 wt % to 40 wt %, of the total weight of the copolymerization mixture. More particularly, best results are obtained with 10 wt % to 30 wt % of the silicone prepolymer.

The silicone monomer accounts for preferably 10 wt % to 50 wt %, and more preferably 15 wt % to 40 wt %, of the total weight of the copolymerization mixture. More particularly, best results are obtained with 20 wt % to 30 wt % of the silicone monomer.

The hydrophilic monomer accounts for preferably 20 wt % to 60 wt %, and more preferably 30 wt % to 50 wt %, of the total weight of the copolymerization mixture. More particularly, best results are obtained with 35 wt % to 45 wt % of the hydrophilic monomer.

The amino alcohol accounts for preferably 1 wt % to 10 wt %, and more preferably 3 wt % to 5 wt %, of the total weight of the copolymerization mixture. The epoxide-containing crosslinking agent accounts for preferably 1 wt % to 10 wt %, and more preferably 3 wt % to 5 wt % of the total weight of the copolymerization mixture.

The silicone monomer may be but not limited to tris(trimethylsiloxy)silylpropyl methacrylate (TRIS), bis(trimethylsiloxy)methylsilylpropyl methacrylate, pentamethyldisiloxanepropyl methacrylate, pentamethyldisiloxanyl methylmethacrylate, tris(trimethylsiloxy)silylpropyloxyethyl methacrylate, tris(trimethylsiloxy)silylpropyl methacryloxyethylcarbamate (TSMC), tris(trimethylsiloxy)silypropyl glycerol methacrylate (SIGMA), tris(polydimethylsiloxy)silylpropyl methacrylate, or combinations thereof. TRIS is chosen as the silicone monomer in this embodiment.

The hydrophilic monomer may be, but not limited to, hydroxyethyl methacrylate (HEMA), methacrylic acid (MAA), N-vinyl pyrrolidone (NVP), N,N'-dimethylacrylamide (DMA), N,N'-diethylacrylamide, N-isopropylacrylamide, 2-hydroxyethyl acrylate, vinyl acetate. N-acryloymorpholine, 2-dimethlaminoethyl acrylate, or combinations thereof N,N'-diethylacrylamide, NVP, and MAA are chosen as the hydrophilic monomer in this embodiment.

The aforementioned embodiments do not limit the timing of addition and heating of the amino alcohol and the crosslinking agent and the chemical with which the epoxide rings link after ring-opening. In another embodiment, the amino alcohol and the crosslinking agent are mixed before performing the radical chain polymerization reaction. A first heating of 120° C. for 10 hours is performed to let the first epoxide ring open and link with the amino alcohol. The hydrophilic monomer is then added and a second heating of 90° C. for 3 hours is performed to let the second epoxide ring open and link with the hydrophilic monomer. The linear silicone prepolymer and the silicone monomer are finally added to perform the radical chain polymerization reaction. To link with opened second epoxide rings, the hydrophilic monomer is required to include a functional group selected from the group consisting of hydroxyl group, carboxyl group, and amine group.

Additionally, m yet another embodiment, the amino alcohol, the crosslinking agent, and a thermal initiator are added to the copolymerization mixture before performing the radical chain polymerization reaction. The copolymerization mixture is then heated to perform the radical chain polymerization reaction and the linking process simultaneously.

The silicon hydrogels/contact lenses prepared by the above-mentioned method may further react with natural/synthetic polymer solution containing 0.01 to 1% of anion, and would immediately generate cross-links of cations/anions, so as to bound the above-mentioned polymer to the surfaces of the silicon hydrogels/contact lenses. The natural polymers may include, but not limited to hyaluronic acid (HA), alginic acid, chondroitin sulfate, sulfated dextran, and heparin. Synthetic polymers include repeating units containing more than 5 functional groups according to any one type of anionic shuttling group, including carboxylate (—COOH), sulfonate (—SO$_3$H), phosphate (—PO$_3$H) and the like.

Testing of the silicone hydrogels and contact lenses manufactured by the aforementioned methods show that contact angle of the surfaces is decreased and adsorption of proteins and lipids is also reduced significantly. Moreover, break-up time (BUT) of the contact lenses, which is the main factor affecting comfort and wearability, has shown to increase remarkably from 4-6 seconds to over 10 seconds. In sum, the present invention provides a contact lens made of silicone with hydrophilic surfaces and methods for manufacturing the same. Polyethylene glycol-containing amino alcohols and epoxides are supplemented into the copolymerization reaction between polysiloxane and hydrophilic monomers, so that polyethylene glycol-containing hydrophilic polymer can form on the surface of the silicone material. A further reaction with polymer with anions would add hydrophilicity and common-ion electrical neutrality to polyethylene glycol, which can inhibit non-specific adsorption of tear proteins and lipids and prevent dry spots caused by hydrophobic silicones. Therefore, surface of the silicone hydrogel-based contact lenses can be made entirely hydrophilic and oxygen permeable, thus providing maximum comfort to wearers of the contact lenses. Furthermore, mass production of the hydrophilic and highly oxygen permeable contact lenses can be accomplished by combining existing manufacturing facilities with the essence of the present invention without any post-processing.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to he accorded with the broadest interpretation so as to encompass all such modifications and similar structures.

What is claimed is:

1. A method for manufacturing a silicone hydrogel, comprising the steps of:
   preparing a mixture, comprising:
      an amino alcohol;
      a crosslinking agent having at least a first epoxide ring and a second epoxide ring; and
      a copolymerization mixture capable of performing a radical chain polymerization reaction, wherein the copolymerization mixture is comprised of a linear silicone prepolymer, a silicone monomer, and a hydrophilic monomer; and
   performing the radical chain polymerization reaction to obtain a silicone hydrogel, and performing a linking process before, simultaneously with, or after performing the radical chain polymerization reaction, the crosslinking agent is activated by heating to let the first epoxide ring open and link with the amino alcohol and to let the second epoxide ring open and link with any one component of the copolymerization mixture, wherein the amino alcohol is represented by formula (1):

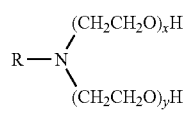

(1)

wherein R of formula (1) is a linear chain of 12-16 carbon atoms, and a sum of x of formula (1) and y of formula (1) falls within the range of 2 to 100.

2. The method for manufacturing a silicone hydrogel according to claim 1, wherein the first epoxide ring links with the amino alcohol to obtain a chemical structure represented by formula (2):

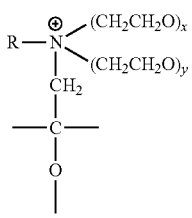

(2)

3. The method for manufacturing a silicone hydrogel according to claim 2, wherein the amino alcohol and the crosslinking agent are added to the copolymerization mixture before performing the radical chain polymerization reaction, and the linking process is performed after completion of the radical chain polymerization reaction by heating the copolymerization mixture to let the first epoxide ring open and link with the amino alcohol and to let the second epoxide ring open and link with the linear silicone prepolymer.

4. The method for manufacturing a silicone hydrogel according to claim 3, wherein the copolymerization mixture is heated to over 90° C. for over 1 hour.

5. The method for manufacturing a silicone hydrogel according to claim 4, wherein the copolymerization mixture comprises 3 wt % to 50 wt % of the silicone prepolymer, 10 wt % to 50 wt % of the silicone monomer, 20 wt % to 60 wt % of the hydrophilic monomer, 1 wt % to 10 wt % of the amino alcohol, and 1 wt % to 10 wt % of the crosslinking agent.

6. The method for manufacturing a silicone hydrogel according to claim 2, wherein the amino alcohol and the crosslinking agent are mixed before performing the radical chain polymerization reaction, and a first heating is performed to let the first epoxide ring open and link with the amino alcohol, the hydrophilic monomer is then added and a second heating is performed to let the second epoxide ring open and link with the hydrophilic monomer, the linear silicone prepolymer and the silicone monomer are finally added to perform the radical chain polymerization reaction.

7. The method for manufacturing a silicone hydrogel according to claim 6, wherein the hydrophilic monomer comprises a functional group selected from the group consisting of: hydroxyl group, carboxyl group, and amine group.

8. The method for manufacturing a silicone hydrogel according to claim 7, wherein the first heating and the second heating are performed at over 90° C. for over 1 hour.

9. The method for manufacturing a silicone hydrogel according to claim 2, wherein before performing the radical chain polymerization reaction, the amino alcohol, the crosslinking agent, and a thermal initiator are added to the copolymerization mixture, the copolymerization mixture is then heated to perform the radical chain polymerization reaction and the linking process simultaneously.

10. The method for manufacturing a silicone hydrogel according to claim 1, further includes a step of:
   reacting the silicone hydrogel with a polymer solution containing 0.01 to 1% of anion.

* * * * *